United States Patent Office 2,853,529
Patented Sept. 23, 1958

2,853,529
PROCESS FOR THE MANUFACTURE OF ACETALS OF CROTONALDEHYDE

Willy O. Herrmann and Ludwig Eibel, Munich, Germany, assignors to Consortium für Elektrochemische Industrie G. m. b. H., Munich, Bavaria, Germany, a corporation No Drawing. Application June 15, 1953
Serial No. 361,847

Claims priority, application Germany June 14, 1952

2 Claims. (Cl. 260—615)

It is known that, when unsaturated aldehydes are reacted with alcohols, there occurs, in addition to the formation of a diacetal, the additive combination of one molecule of the alcohol at the double bond to form, for example, a trialkoxy-butane. It is also known that $\alpha:\beta$-unsaturated vinyl ethers combine additively with one molecule of an alcohol accompanied by the disappearance of the double bond and form the corresponding diacetal.

The present invention is based on the unexpected observation that butadienyl ethers react with alcohols to form a diacetal, but accompanied by the change in position of a double bond which is maintained without the additive combination of one molecule of the alcohol at the double bond. In this manner acetals of crotonaldehyde are formed, which can be produced by this reaction in a very simple manner from butadienyl ethers and alcohols.

The process of this invention provides a method of producing acetals of crotonaldehyde which are difficult to prepare in other ways, more especially any desired mixed acetals of crotonaldehyde.

The butadienyl ethers can easily be prepared by splitting up trialkoxy-butanes.

The formation of acetals from the butadienyl ethers often takes place even in mixtures of the reaction components. Their formation is advantageously promoted and accelerated by means of catalysts, and may, if desired, be assisted by the supply of heat. Owing to the evolution of heat of reaction, heating for a short time often suffices to start the reaction.

In some cases only small traces of a strong inorganic acid catalyst are sufficient. Thus, for example, acetal formation takes place when, in the splitting up of trialkoxy-butanes by a heating process, the reaction mixture obtained by distillation and containing a butadienyl ether and an alcohol is allowed to stand.

The fundamentally simple chemical reaction can be carried out by simple methods.

The following example illustrates the invention:

100 grams of butadienyl ethyl ether were mixed with 100 grams of anhydrous ethyl alcohol and 3 drops of concentrated sulphuric acid were added as catalyst. Under a reflux condenser the reaction was initiated and accelerated by gentle heating to about 30° C. The evolution of heat which took place raised the temperature to the boiling point of the reaction mixture. After cooling the mixture, it was neutralised with its own volume of a caustic soda solution of 20 percent strength, and a part of the excess of ethanol was washed out. 176 grams of an organic phase were obtained. By fractionation there were isolated 83 grams of crotonaldehyde diethyl acetal boiling at 147° C. under 720 mm. pressure. Allowing for the 45 grams of butadienyl ethyl ether which remained behind in dimeric form the yield was quantitative.

By this process there can be obtained, inter alia, the same mixed acetal from two different butadienyl ethers, as will be seen from the acetals so obtained and set out in the following tables:

Table A

| Acetals obtained from butadienyl methyl ether | Molecular weight | Boiling point under 720 mm. pressure, °C. |
|---|---|---|
| Crotonaldehyde dimethyl acetal | 116 | 117 |
| Crotonaldehyde methyl ethyl acetal | 130 | 120 |
| Crotonaldehyde methyl isopropyl acetal | 144 | 142 |
| Crotonaldehyde methyl butyl acetal | 158 | 163 |
| Crotonaldehyde methyl allyl acetal | 142 | 151 |

Table B

| Acetals obtained from butadienyl ethyl ether | Molecular weight | Boiling point under 720 mm. pressure, °C. |
|---|---|---|
| Crotonaldehyde diethyl acetal | 144 | 147 |
| Crotonaldehyde ethyl methyl acetal | 130 | 120 |
| Crotonaldehyde ethyl isopropyl acetal | 158 | 150 |
| Crotonaldehyde ethyl butyl acetal | 172 | 179 |
| Crotonaldehyde ethyl allyl acetal | 156 | 164 |

The invention claimed is:

1. Process for producing acetals of crotonaldehyde from a butadienyl ether selected from the group consisting of butadienyl ethyl ether and butadienyl methyl ether which comprises reacting said butadienyl ether at atmospheric pressure, in the absence of water, and at a temperature of about 30° C. with an alcohol selected from the group of univalent saturated aliphatic alcohols consisting of ethyl alcohol, methyl alcohol, butyl alcohol and isopropyl alcohol.

2. Process for producing acetals of crotonaldehyde from a butadienyl ether selected from the group consisting of butadienyl ethyl ether and butadienyl methyl ether which comprises reacting said butadienyl ether at atmospheric pressure, in the absence of water, and at a temperature of about 30° C. with allyl alcohol.

References Cited in the file of this patent

UNITED STATES PATENTS

| 2,000,252 | Reppe et al. | May 7, 1935 |
| 2,524,778 | Dermer et al. | Oct. 10, 1950 |
| 2,573,678 | Saunders | Nov. 6, 1951 |
| 2,678,950 | Myers et al. | May 18, 1954 |

OTHER REFERENCES

Burwell: Chemical Reviews, vol. 54 (1954), pp. 615–685.